(12) United States Patent
Khusuwan et al.

(10) Patent No.: US 12,543,263 B2
(45) Date of Patent: Feb. 3, 2026

(54) PRE-PACKAGE FOR A PRINTED CIRCUIT BOARD FOR A SMART CARD AND METHOD OF FORMING SAME

(71) Applicant: LINXENS HOLDING, Mantes la Jolie (FR)

(72) Inventors: Khiengkrai Khusuwan, Bang pa-in (TH); Anupont Phakping, Bang pa-in (TH)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 18/862,433

(22) PCT Filed: May 9, 2022

(86) PCT No.: PCT/IB2022/000260
§ 371 (c)(1),
(2) Date: Nov. 1, 2024

(87) PCT Pub. No.: WO2023/218216
PCT Pub. Date: Nov. 16, 2023

(65) Prior Publication Data
US 2025/0301567 A1    Sep. 25, 2025

(51) Int. Cl.
*G06K 7/10* (2006.01)
*H05K 1/02* (2006.01)

(52) U.S. Cl.
CPC ....... *H05K 1/0277* (2013.01); *G06K 7/10366* (2013.01)

(58) Field of Classification Search
CPC .......... H05K 1/0277; G06K 7/10366
See application file for complete search history.

(56) References Cited

FOREIGN PATENT DOCUMENTS

| DE | 3924439 A1 | 4/1991 |
| EP | 2715619 B1 | 5/2016 |
| WO | 2021176247 A1 | 9/2021 |
| WO | 202162994 A1 | 12/2021 |

OTHER PUBLICATIONS

International Search Report and Written Opinion of the International Searching Authority for related International Application No. PCT/IB2022/000260, dated Feb. 14, 2023, 9 pages.

*Primary Examiner* — Jamara A Franklin
(74) *Attorney, Agent, or Firm* — DITTHAVONG, STEINER & MLOTKOWSKI (57) ABSTRACT

The present invention refers to a pre-package for a flexible printed circuit board for a smartcard. The pre-package comprises a flexible printed circuit board including one or more non-planar circuit portions; a first layer of a first material at least partially covering a first side of the flexible printed circuit board so as to form a planar layer; a second layer of a second material covering a second side of the flexible printed circuit board; and a third layer comprising a hardening material at least partially covering the first side so as to form a planar layer. The third layer has a third hardness value which is higher than the first hardness value and/or than the second hardness value of the first and second dielectric materials, respectively. The pre-package may be advantageously inserted into a smartcard having a suitable window for accommodating the pre-package comprising the electronic components. The present invention also refers to the methods for forming the pre-package and the smartcard comprising it.

20 Claims, 6 Drawing Sheets

PRE-PACKAGE FOR A PRINTED CIRCUIT BOARD FOR A SMART CARD AND METHOD OF FORMING SAME

RELATED APPLICATION

This application claims priority to International Application No. PCT/IB2022/000260, filed May 9, 2022, the contents of which are incorporated by reference herein in its entirety.

TECHNICAL FIELD

The present invention generally relates to smartcards of any type, such as credit cards, payment cards, key cards, electronic labels, datapages of security documents, and the like, in which a card-type substrate includes electronic components for providing information and/or responding to external stimuli, and the like.

BACKGROUND ART

A smartcard refers to a card comprising a plurality of plastic layers that are processed so as to form a substantially monolithic block of material and a plurality of electronic components incorporated therein. The electronic components may comprise one or more antennas, for instance for imparting RFID (radio frequency identification) capabilities to the smartcard, electronic modules for storing and processing information, a corresponding network of electrical connections, additional components for inductively and/or capacitively interconnecting card-internal components, and the like.

Due to the widespread of smartcards in different fields and applications, such as for instance the field of financial transactions, there is a constant need of developing new techniques for connecting the various plastic layers so as to form the substantially monolithic material block, while at the same time appropriately encapsulating the relevant functional and electronic components.

Current approaches include incorporating discrete electronic and/or optical components, power supply devices, and the like into a smartcard in order to provide superior functionality. For example, pre-forms for smartcards may be provided, which enable the successive incorporation of specific, additional components in order to provide for customized smartcards having specific functionality. Many of these additional components may have a substantially non-planar configuration, i.e., a configuration with increased height dimensions compared to the respective lateral dimensions of any such component, thereby requiring significant efforts to be incorporated into the smartcards. Moreover, additional components must be incorporated on the basis of efficient volume production techniques, while at the same time guaranteeing a high degree of integrity with respect to tamper resistance and robustness of smartcards in view of any environmental influences and mechanical stress, in order to achieve a required long lifetime of any such smartcards.

The patent document EP2715619 refers to a security document and to a method for producing same, wherein the security document comprises a card body made of a plurality of layers and at least one display module having a non-planar configuration, that is having a thickness greater than a thickness of a single layer of the card body. At least one compensation layer is added between the display module and the card substrate layer receiving the antenna connected to the display module, in order to compensate for the height difference between the card body layers and the display module. According to this method, the display module and the other non-planar electronic components are directly incorporated into the smartcard by forming respective openings in the compensation layers, by inserting the respective components and by laminating the respective layers together. Since the electronic components are directly incorporated into the card body, they are susceptible to being damaged during usage.

The patent application WO2021/176247 refers to pre-forms for smartcards and to a method for producing same, wherein the electronic components to be incorporated into the pre-forms are preliminary "packed" and encapsulated in a plurality of plastic layers and are subsequently inserted into corresponding windows of the pre-forms. In this way, superior robustness and production yields are achieved. However, the pre-package structure comprises many layers encapsulating the electronic component, because also compensation layers are needed for compensating for the different heights of the electronic parts. Accordingly, it is difficult to meet smartcard size requirements. Moreover, the external surface of the pre-package is not planar because it tends to shrink during the lamination process and this makes the insertion process into the smartcard even more complex.

In view of the problems explained above, there is a need to provide a pre-form for a smartcard and a smartcard, wherein the electronic components are preliminarily encapsulated into a simple structure prior to incorporation into the smartcard, so that increased mechanical robustness for the electronic components is provided, while still ensuring high flexibility and meeting of the standard size requirements.

SUMMARY

According to a first aspect of the present invention, a pre-package for a flexible printed circuit board for a smartcard is provided, the pre-package comprising the following elements:

A flexible printed circuit board including one or more non-planar circuit portions, the flexible printed circuit board having a first side and a second side opposite to the first side;

A first layer of a first material at least partially covering the first side of the flexible printed circuit board so as to form a planar layer;

A second layer of a second material covering the second side of the flexible printed circuit board; and A third layer comprising a hardening material at least partially covering the first side so as to form a planar layer;

wherein the first material has a first VICAT softening temperature and the second material has a second VICAT softening temperature, and the third layer has a third VICAT softening temperature, wherein the third VICAT softening temperature is higher than the first VICAT softening temperature and/or than the second VICAT softening temperature.

The advantage of this solution is that the flexible printed circuit board including the non-planar circuit portions is encapsulated and protected in a pre-package of dielectric material. The pre-package has a simple structure because it comprises a limited number of layers, preferably three layers. In this way, the pre-package and the smartcard comprising the pre-package are able to fulfil ISO7810/7816 card quality requirements. Moreover, since the third layer comprises a hardening material having a VICAT softening temperature higher than the VICAT softening temperature of the first and/or the second layer of material, the third layer does not shrink during lamination of the smartcard as a consequence of the temperatures and the pressures applied. In this way, levelling of the outermost layer of the pre-package is optimized and the surface visibility is improved.

In the present disclosure, it has to be understood that the flexible printed circuit board has the shape of a board having a main top surface and a main bottom surface, which are referred to as "first side" and "second side", respectively. However, since there is no preferred orientation of the flexible printed circuit board, the main top surface could also represent the "second side" and the main bottom surface could also represent the "first side".

Moreover, in the present disclosure, the VICAT softening temperature is defined as the temperature at which a specimen of a given material is penetrated to a depth of 1 mm by a flat-ended needle with a 1 mm2 circular or square cross-section. For the VICAT A test, a load of 10 N is used. For the VICAT B test, the load is 50 N. Standards to determine VICAT softening point may include for instance ASTM D 1525 and/or ISO 306. The VICAT softening temperature can be used to compare the heat-characteristics of different materials: in the present disclosure, it has to be understood that, the same VICAT test, for instance VICAT A test or VICAT B test, must be used to compare the first, second and third hardening materials.

For instance, the first material may comprise a first dielectric material. For instance, the second material may comprise a second dielectric material.

According to an embodiment of the present invention, a pre-package is provided, wherein the hardening material has a flexural strength comprised between 40 MPa and 150 MPa and/or a flexural modulus comprised between 0.5 GPa and 3 GPa.

The advantage of this configuration is that the third layer does not shrink nor is deformed during the lamination process and during exposure to high temperatures and pressures thanks to the high values of flexural strength and flexural modulus The flexural strength, also known as modulus of rupture, or bend strength, or transverse rupture strength, is a material property, which represents the highest stress experienced within the material at its moment of yield in a flexure test.

The flexural modulus or bending modulus is an intensive property that is computed as the ratio of stress to strain in flexural deformation, or the tendency for a material to resist bending.

According to another embodiment of the present invention, a pre-package is provided, wherein said hardening material has a VICAT softening temperature comprised between 68° C. and 150° C.

The advantage of this configuration is that the hardening material does not shrink nor is deformed during the lamination process and during exposure to high temperatures and pressures.

According to another embodiment of the present invention, a pre-package is provided, wherein the hardening material comprises PET and/or PI.

The advantage of this configuration is that PET and/or PI are not deformed nor shrunk during the lamination process.

According to another embodiment of the present invention, a pre-package is provided, wherein the first layer has an opening and the third layer is placed into the opening so as to complete said first planar layer.

The advantage of this configuration is that the third layer covers the flexible printed circuit board and can form a continuous layer together with the first layer. Moreover, the third layer compresses and flattens the adhesive material that is used to connect the third layer to the flexible printed circuit board and prevents overflowing of the adhesive material during application and prior to polymerization, for instance by means of UV radiation. Preferably, the third layer is flushed with the first layer so as to form a continuous planar layer. In this way, levelling of the pre-package is optimized and surface visibility is improved.

According to another embodiment of the present invention, a pre-package is provided, wherein the third layer is attached to the first side of the flexible printed circuit board and/or to the first layer through an adhesive layer.

The advantage of this configuration is that the third layer is firmly attached to the first side of the flexible printed circuit board and/or to the first layer thanks to the adhesive material. According to a preferred configuration, the adhesive material is initially deposited on the first side of the flexible printed circuit board in a viscous configuration, so that it can flow and fill in the discontinuities between the one or more non-planar circuit portions of the flexible printed circuit board. The third layer is then placed on the viscous adhesive layer. Finally, curing of the adhesive layer is induced. In this way, the third layer is attached to the first side of the flexible printed circuit board through the adhesive material and it is not deformed by the discontinuities of the non-planar circuit portions formed on the flexible printed circuit board.

According to a preferred configuration, the third layer is partially attached to the external surface of first layer of the pre-package through an adhesive layer.

According to another embodiment of the present invention, a pre-package is provided, wherein the adhesive layer comprises a UV curing adhesive material.

The advantage of this configuration is that the adhesive material can be initially deposited on the first side of the flexible printed circuit board in a viscous state and it can be subsequently cured and solidified via UV radiation.

According to another embodiment of the present invention, a pre-package is provided, wherein the first layer and the second layer comprise PVC, PETG, PLA, PU and/or polycarbonate.

The advantage of using PVC, PETG, PLA, PU and/or polycarbonate to form the first and the second layer is that these materials have high mechanical resistance and they can reinforce the pre-package and protect the IC chip.

According to another embodiment of the present invention, a pre-package is provided, wherein the first layer and/or the second layer comprise one or more windows for accommodating the one or more non-planar circuit portions.

The advantage of this configuration is that it is possible to provide mechanical robustness and stability to the flexible printed circuit board, while still ensuring electrical contact between the protruding non-planar circuit portion and the other components of the smartcard, because the circuit portions are not completely covered by the first and/or second layers.

Preferably, the second layer comprises one window for accommodating a display module formed on the second side of the flexible printed circuit board. In this way, part of the display module is visible through the window.

According to another embodiment of the present invention, a smartcard is provided, wherein the smartcard comprises a stack of card layers forming a smartcard body having a window and a pre-package as the ones described above that is embedded in the window.

The advantage of this configuration is that the flexible printed circuit board comprising the electronic components is encapsulated and protected by the pre-package, before being inserted in the window of the smartcard. Accordingly, higher mechanical resistance for the electronic components is ensured. Moreover, since the pre-package has a simple structure with a reduced number of plastic layers, the smartcard meets the card size requirements, for example ISO7810/7816 standards.

According to another aspect of the present invention, a method for forming a pre-package for a flexible printed circuit board for a smartcard is provided, the method comprising the following steps:
  a) Providing one or more flexible printed circuit boards, each flexible printed circuit board including at least one non-planar circuit portion and having a first side and a second side opposite to said first side;
  b) At least partially covering said first side of each flexible printed circuit board with a first layer of dielectric material, so as to form a first planar layer on the first side;
  c) Covering the second side of each flexible printed circuit board with a second layer of dielectric material;
  d) Further covering the first side with a third layer of a hardening material,
wherein the first material has a first VICAT softening temperature and the second material has a second VICAT softening temperature, and the third layer has a VICAT softening temperature higher than the first VICAT softening temperature and/or than the second VICAT softening temperature.

The advantage of this method is that it provides higher mechanical resistance to the flexible printed circuit board comprising the non-planar electronic components, because the flexible circuit board is preliminary encapsulated in the pre-package. Moreover, according to this method, the card size requirements, for instance the ISO7810/7816 requirements, are met, because the pre-package has a simple structure comprising a reduced number of layers, preferably three layers. Moreover, thanks to the fact that the third layer has a higher VICAT softening temperature than the VICAT softening temperature of the first and/or second layer, leveling of the pre-package is optimized. In fact, during the lamination process, high temperatures and pressures are applied and shrinkage or deformation of the third layer is prevented by the hardening material.

According to another embodiment of the present invention, a method for forming a pre-package is provided, further comprising the following step:
  e) Attaching the third layer to the first side of the flexible printed circuit board and/or to the first layer through a fourth layer of adhesive material, for instance a UV curing adhesive material.

The advantage of this method is that the third layer is firmly attached to the first side of the flexible printed circuit board and/or to the first layer thanks to the adhesive layer. The adhesive material is preferably deposited on the first side of the flexible printed circuit board in a viscous state and it is subsequently cured after application of the third layer. In this way, the different heights of the non-planar circuit portions formed on the flexible printed circuit board are compensated by filling in the adhesive material and the third layer can be securely attached on the flexible printed circuit board. Preferably, curing of the adhesive material is induced via UV radiation.

According to another embodiment of the present invention, a method for forming a pre-package is provided, wherein the first layer of material has an opening and the step d) is carried out by placing the third layer into the opening so as to complete the first planar layer.

The advantage of this configuration is that the third layer covers the flexible printed circuit board and can form a continuous layer together with the first layer. Moreover, the third layer compresses and flattens the adhesive material that is used to connect the third layer to the flexible printed circuit board and prevents overflowing of the adhesive material during application and prior to polymerization, for instance by means of UV radiation.

Preferably, the third layer is placed in the opening so as to form a continuous planar layer together with the first layer of dielectric material.

According to another embodiment of the present invention, a method for forming a pre-package is provided, wherein the one or more flexible printed circuit boards are provided in a first reel and they are arranged so as to form an array, and wherein the first layer and the second layer are provided in a second reel and a third reel, respectively, and the method is carried out with a reel-to-reel process.

The advantage of this method is that the process for forming a pre-package for a flexible printed circuit board is carried out in a fast and efficient way thanks to a reel-to-reel process. Moreover, the number of layers applied to the flexible printed circuit board is limited, therefore the process is further simplified.

According to another embodiment of the present invention, the pre-package may be formed by means of a plurality of foils having a predefined size, for instance an A4 size or bigger, wherein a first foil comprises a plurality of elements forming the first layer, a second foil comprises a plurality of elements forming the second layer and a third foil comprises a plurality of flexible printed circuit boards. Preferably, the first foil, the second foil and the third foil are superimposed so that a first element forming the first layer, a second element forming the second layer and a flexible printed circuit board are superimposed and attached to each other, in order to form the pre-package. Preferably, the first foil, the second foil and the third foil have an A4 size.

Preferably, the pre-package may be formed by means of a reel-to-reel process having a predefined layout, for instance an A4 layout or bigger.

According to further embodiment of the present invention, a method for forming a pre-laminate for a smartcard is provided, the method comprising the following steps:
  f) Providing a stack of card layers so as to form a pre-laminate body having a window;
  g) Forming a pre-package according to one of the methods described above;
  h) Embedding the pre-package in the window of the stack of card layers.

The advantage of this method is that the electronic components of the smartcard are preliminary encapsulated and protected in a pre-package structure and they are not placed in direct contact with the other layers of the pre-laminate for the smartcard.

According to a further embodiment of the present invention, a method for forming a smartcard is provided, the method comprising the following steps:
  i) Forming a pre-laminate according to the previous method, said pre-laminate having a first side and a second side;
  j) Attaching one or more external layers to the first side and/or to the second side so as to cover the pre-laminate and so as to form the smartcard.

The advantage of this method is that the electronic components of the smartcard are preliminary encapsulated and protected in a pre-package structure and they are not placed in direct contact with the other layers of the smartcard.

FIGURES

The present invention will be described with reference to the attached figures in which the same reference numbers and/or signs indicate the same parts and/or similar and/or corresponding parts of the structure.

DETAILED DESCRIPTION

In the following, the present invention is described with reference to particular embodiments, as is illustrated in the enclosed figures. However, the present invention is not limited to the particular embodiments described in the following detailed description and shown in figures. Instead, the described embodiments simply exemplify the different features of the present invention, the scope of which is defined in the claims. Further modifications and variations of the present invention will be clear to the skilled person.

Figure 1:
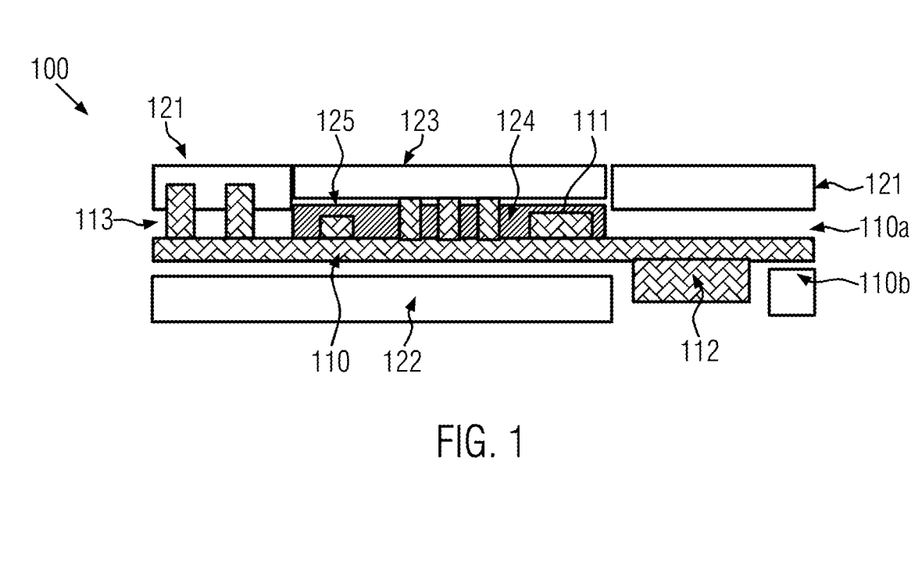
FIG. 1 schematically illustrates a cross-section of a pre-package for a smartcard according to an embodiment of the present invention.

FIG. 1 schematically illustrates a cross-sectional view of a pre-package 100 according to an embodiment of the present invention.

The pre-package 100 comprises a flexible printed circuit board 110, having a top, first side 110a and a second, bottom side 110b. The flexible printed circuit board 110 comprises one or more non-planar electronic components 111, 112, 113. It has to be understood that the flexible printed circuit board 110 comprises a board substrate on which one or more electronic components 111, 112, 113 are formed, for instance a display module, a keyboard or individual press button, energy storage components such as batteries, optical components and the like. The electronic components 111, 112, 113 protrude from the board substrate of the flexible printed circuit board 110 and they have different heights with respect to the substrate. Accordingly, they are referred to as non-planar electronic components.

The first side 110a of the flexible printed circuit board 110 is covered with a first layer of material 121 and a third layer of material 123. The second side 110b of the flexible printed circuit board 110 is covered with a second layer of material 122. For instance, the first layer 121 and the second layer 122 may comprise PVC and/or polycarbonate material. The first layer 121 comprises an opening 125, wherein a third layer 123 of material is placed. The third layer 123 is flush with the first layer 121, so as to form a continuous layer of dielectric material. The third layer 123 is attached to the first side 110a of the flexible printed circuit board 110 through a layer of adhesive material 124. Preferably, the adhesive material 124 comprises a UV adhesive material. The third layer 123 has also the function of "anti-sink down layer". In fact, the third layer 123 compresses and flattens the adhesive material 124 and prevents overflowing of the adhesive material 124 during application in the liquid state and prior to polymerization (for instance UV polymerization).

Alternatively or in addition, the third layer 123 may be attached to part of the top surface of the first layer 121 through an adhesive material 124.

The third layer 123 of material has a VICAT softening temperature that is higher than the VICAT softening temperature of the first layer 121 and/or the second layer 122 of dielectric material. In this way, during the lamination process for the formation of the pre-package 100 and the smartcard 500 (described below), the third layer 123 does not shrink nor is deformed because of the application of high temperatures and pressures.

Figure 2:
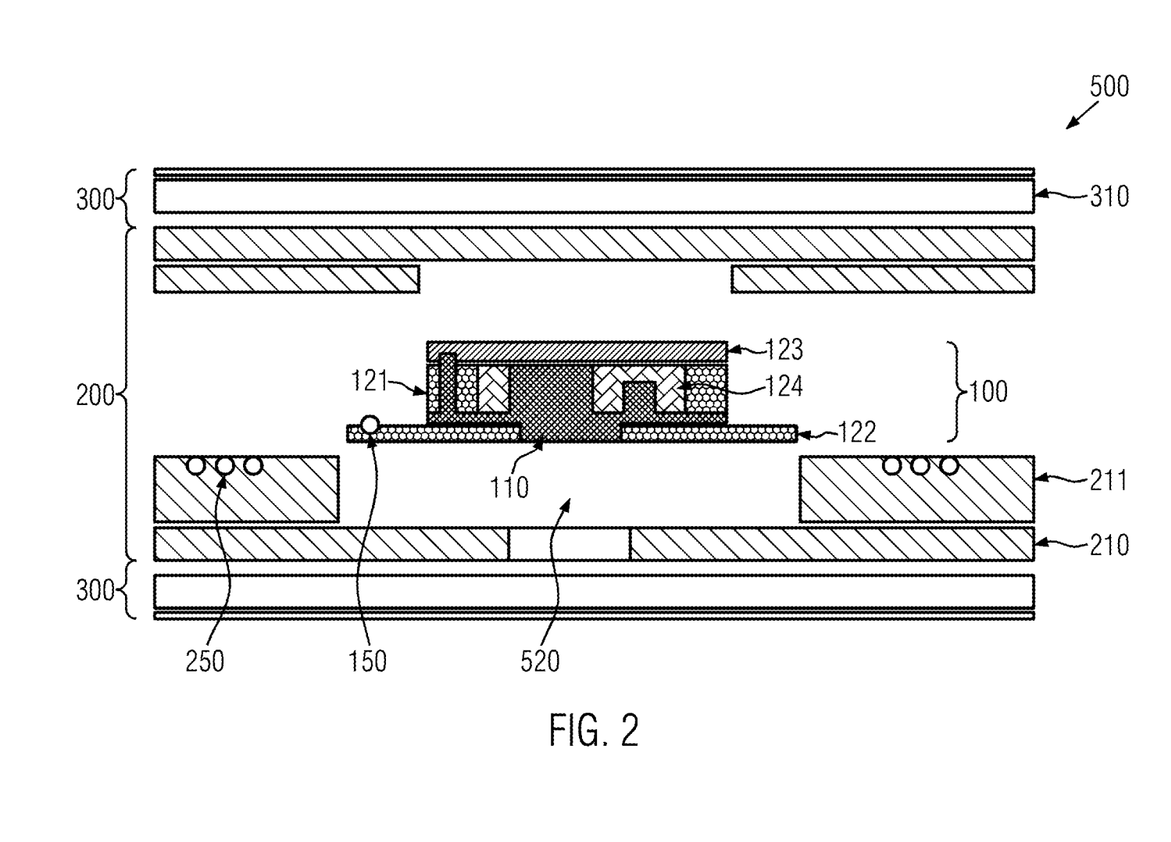
FIG. 2 schematically illustrates a cross-section of a smartcard comprising a pre-laminate and a pre-package according to an embodiment of the present invention.

After formation, the pre-package 100 may be inserted into a corresponding window 520 of a smartcard 500, which is schematically illustrated in the cross sectional view of FIG. 2. As it can be seen in FIG. 2, the smartcard 500 comprises a pre-laminate structure 200, having a window 520, and a first and a second stack of external layers 300.

The pre-laminate structure 200 comprises the central plastic layers 210 of the smartcard 500 and the electronic components 110, 111, 112, 113, which represent the core of the smartcard 500. In other words, the term "pre-laminate" refers to the structure of the smartcard comprising the plastic layers 210 and the electronic components 110, 111, 112, 113 that are assembled together prior to lamination to the external layers 310, which are subsequently added to the smartcard 500 for aesthetic purposes and for providing additional mechanical robustness.

The pre-laminate 200 comprises a window 520 that is sized so as to match the dimensions of the pre-package 100.

The pre-laminate 200 further comprises a layer 211 including a wire-embedding antenna 250, which is configured to be connected to the electronic components of the pre-package 100, such as the flexible printed circuit board 110 and/or the circuit portions 111, 112, 113. Accordingly, the pre-package 100 comprises a layer 122 including a contact pad 150 to be connected to the wire of the antenna 250, in order to enable communication with external devices. The layer 122 protrudes from the edges of the second side 110b of the pre-package 100.

The pre-package 100 according to the present invention may be advantageously formed in a reel-to-reel process, which is described with reference to FIGS. 3a, 3b, 4, 5 and 6.

Figure 3A:
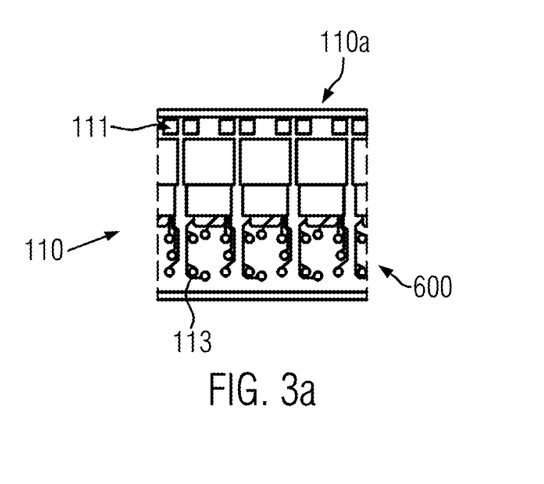
FIG. 3a schematically illustrates a top view of a first side of a flexible printed circuit board according to an embodiment of the present invention.

FIG. 3a schematically illustrates a detail of a reel 600 comprising a plurality of flexible printed circuit boards 110. In particular, FIG. 3a schematically illustrates the first side 110a of the flexible printed circuit boards 110 formed on the reel 600. On the first side 110a, non-planar electronic components 111 are formed.

Figure 3B:
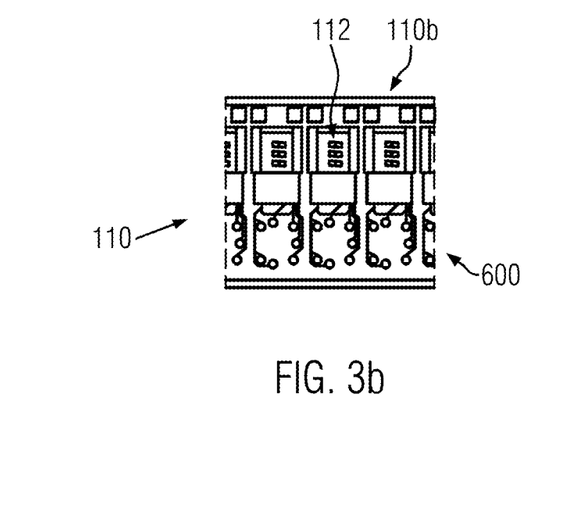
FIG. 3b schematically illustrates a top view of a second side of a flexible printed circuit board according to an embodiment of the present invention.

FIG. 3b schematically illustrates a detail of a reel 600 comprising a plurality of flexible printed circuit boards 110. In particular, FIG. 3b schematically illustrates the second side 110b of the flexible printed circuit boards 110 formed on the reel 600. On the second side 110b, non-planar electronic components 112 are formed. For instance, the non-planar electronic components 112 may include display modules.

Figure 4:
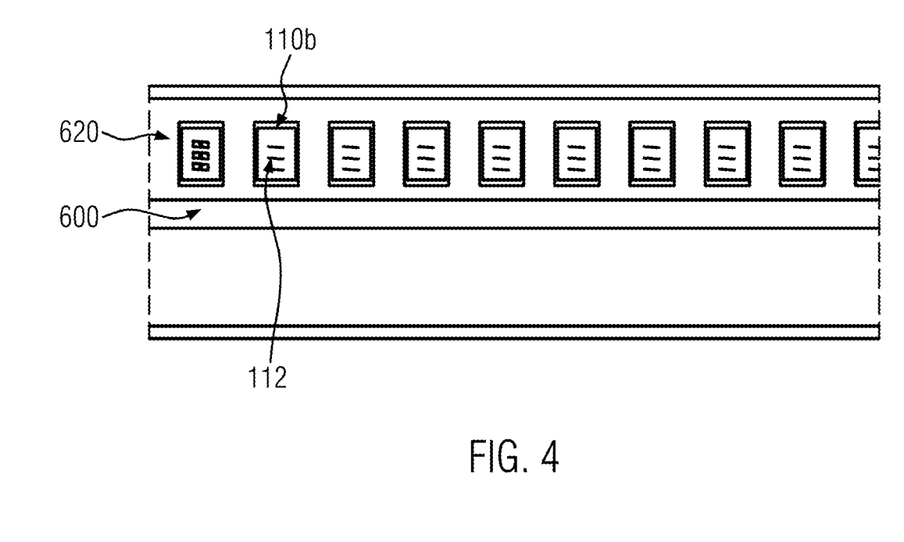
FIG. 4 schematically illustrates a step of a process for forming a pre-package for a smartcard according to an embodiment of the present invention.

FIG. 4 schematically illustrates a step of a method for forming a pre-package 100 for a smartcard, according to an embodiment of the present invention. In FIG. 4, a second reel 620 of material is placed on the first reel 600 of flexible printed circuit boards 110, in particular the second reel 620 is attached to the second side 110b of the reel 600. The second reel 620 comprises a plurality of openings in correspondence with the non-planar electronic components 112. For instance, the non-planar electronic components 112 may comprise display modules that must be visible from the back of the pre-package 100 during usage of the final smartcard 500.

Figure 5:
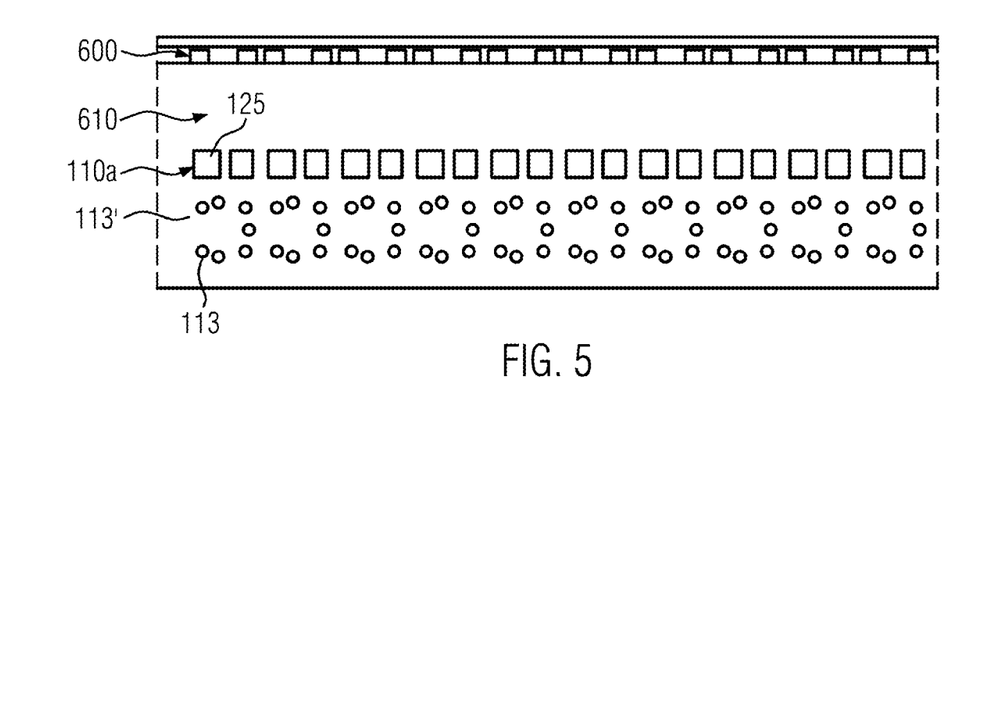
FIG. 5 schematically illustrates a step of a process for forming a pre-package for a smartcard according to an embodiment of the present invention.

FIG. 5 schematically illustrates a further step of the process for forming the pre-package 100 according to an embodiment of the present invention. A third reel 610 of material is applied on the first reel 600 comprising the plurality of flexible printed circuit boards 110. In particular, the third reel 610 is placed on the first side 110a of the reel 600 of the flexible circuit boards 110. The third reel 610 comprises a plurality of holes 113' in correspondence with the non-planar electronic components 113 of the flexible printed circuit boards 110, so that the non-planar electronic components 113 can contact the other electronic components of the smartcard.

The third reel 610 further comprises a plurality of windows 125 accommodating the electronic components 111.

Figure 6:
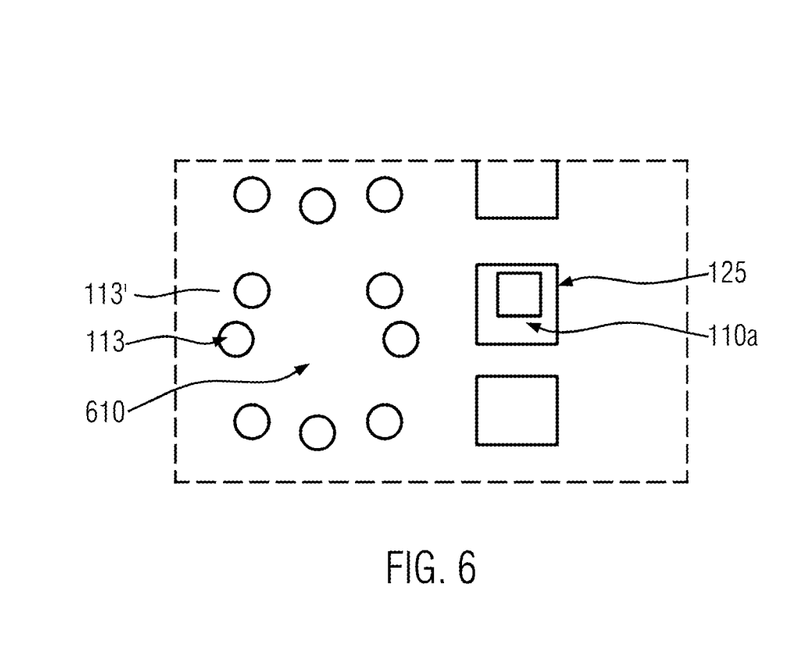
FIG. 6 schematically illustrates a step of a process for forming a pre-package for a smartcard according to an embodiment of the present invention.

FIG. 6 schematically illustrates a detail of the third reel of material 610. In FIG. 6, the openings 113' for accommodating the electronic components 113 and the windows 125 for accommodating the electronic components 111 are clearly visible. The openings 113' are not filled with any dielectric material, in order to ensure an electrical connection between the electronic components 113 and the other electronic components of the smartcard 500. On the other hand, each window 125 is filled with an adhesive material, for instance a UV adhesive material.

The adhesive material is preferably applied in the windows 125 in a viscous state, so that it can flow in the windows 125 and fill in the gaps on top or between the non-planar electronic components 111 formed on the first side 110a. After application of the adhesive material, a hardening material, such as Epoxy Glass, is placed on each window 125 in order to further cover and protect the first side 110a of the flexible printed circuit board 110. The hardening material comprises a solid layer of material that forms the third layer 123 of the pre-package 100 and that is not deformed by contact with the non-planar electronic components 111 of the flexible printed circuit board 110. After attachment of the hardening layer 123, the adhesive material is cured, for instance via UV radiation, in order to provide a stable attachment between the first side 110a of the flexible printed circuit board 110 and the third layer 123 of dielectric material.

In this way, a multi-layered reel comprising a plurality of pre-packages 100 is obtained. The multi-layered reel comprises a central reel 600 of flexible printed circuit boards 600 laminated between two external reels 610 and 620 of dielectric material.

Even if the present invention has been described with reference to the embodiments described above, it is clear to the skilled person that it is possible to apply different modifications, variations and improvements of the present invention in light of the teachings described above and the field, and within the scope of the enclosed claims, without departing from the scope and purpose of the present invention.

For instance, it has to be understood that any layout may be used in the reel-to-reel process.

Finally, those fields considered known to the skilled person have not been described to avoid covering in a useless way the described invention.

REFERENCE NUMBERS

100: pre-package
110: flexible printed circuit board
110a: first side of the flexible printed circuit board
110b: second side of the flexible printed circuit board
111, 112, 113: non-planar circuit portions
113': holes
121: first layer of first material
122: second layer of second dielectric material
123: third layer of hardening material
124: adhesive material
125: opening
130: anti-sink layer
140: additional layer of dielectric material
150: antenna contact
200: pre-laminate
210, 211: pre-laminate layers
250: card antenna
300: cover
310: external layer
500: smartcard
520: window of the smartcard
600, 610, 620: reel

The invention claimed is:

1. A pre-package for a flexible printed circuit board for a smartcard said pre-package comprising the following elements:
a flexible printed circuit board including one or more non-planar circuit portions, said flexible printed circuit board having a first side and a second side opposite to said first side;
a first layer of a first material at least partially covering said first side of said flexible printed circuit board so as to form a planar layer;
a second layer of a second material covering said second side of said flexible printed circuit board; and
a third layer comprising a hardening material at least partially covering said first side so as to form a planar layer;
wherein said first material has a first VICAT softening temperature and said second material has a second VICAT softening temperature, and said third layer has a third VICAT softening temperature, wherein said third VICAT softening temperature is higher than said first VICAT softening temperature or than said second VICAT softening temperature.

2. The pre-package according to claim 1, wherein said hardening material has a flexural strength comprised between 40 MPa and 150 MPa or a flexural modulus comprised between 0.5 GPa and 3 GPa.

3. The pre-package according to claim 1, wherein said hardening material has a VICAT softening temperature comprised between 68° C. and 150° C.

4. The pre-package according to claim 1, wherein said hardening material comprises PET or PI.

5. The pre-package according to claim 1, wherein said first layer has an opening and said third layer is placed into said opening so as to complete said first planar layer.

6. The pre-package according to claim 1, wherein said third layer is attached to said first side of said flexible printed circuit board and/or to said first layer through an adhesive layer.

7. The pre-package according to claim 6, wherein said adhesive layer comprises a UV curing adhesive material.

8. The pre-package according to claim 1, wherein said first layer and said second layer comprise PVC, PETG, PLA, PU or polycarbonate.

9. The pre-package according to claim 1, wherein said first layer or said second layer comprise one or more windows for accommodating said one or more non-planar circuit portions.

10. A smartcard comprising:
a stack of card layers forming a smartcard body having a window; and
a pre-package that is embedded in said window, wherein the pre-package comprises:
a flexible printed circuit board including one or more non-planar circuit portions, said flexible printed circuit board having a first side and a second side opposite to said first side;
a first layer of a first material at least partially covering said first side of said flexible printed circuit board so as to form a planar layer;
a second layer of a second material covering said second side of said flexible printed circuit board; and
a third layer comprising a hardening material at least partially covering said first side so as to form a planar layer;
wherein said first material has a first VICAT softening temperature and said second material has a second VICAT softening temperature, and said third layer has a third VICAT softening temperature, wherein said third VICAT softening temperature is higher than said first VICAT softening temperature or than said second VICAT softening temperature.

11. The smartcard according to claim 10, wherein said hardening material has a flexural strength comprised between 40 MPa and 150 MPa or a flexural modulus comprised between 0.5 GPa and 3 GPa.

12. The smartcard according to claim 10, wherein said hardening material has a VICAT softening temperature comprised between 68° C. and 150° C.

13. The smartcard according to claim 10, wherein said hardening material comprises PET or PI.

14. The smartcard according to claim 10, wherein said first layer has an opening and said third layer is placed into said opening so as to complete said first planar layer.

15. A method for forming a pre-package for a flexible printed circuit board for a smartcard, said method comprising the following steps:
a) Providing one or more flexible printed circuit boards, each flexible printed circuit board including at least one non-planar circuit portion and having a first side and a second side opposite to said first side;
b) At least partially covering said first side of each flexible printed circuit board with a first layer of material, so as to form a first planar layer on said first side;
c) Covering said second side of each flexible printed circuit board with a second layer of material; and
d) Further at least partially covering said first side with a third layer of a hardening material,
wherein said first material has a first VICAT softening temperature and said second material has a second VICAT softening temperature, and said third layer has a third VICAT softening temperature, wherein said third VICAT softening temperature is higher than said first VICAT softening temperature or than said second VICAT softening temperature.

16. The method for forming a pre-package according to claim 15, further comprising the following step:
e) Attaching said third layer to said first side of said flexible printed circuit board or to said first layer through a fourth layer of adhesive material, for instance a UV curing adhesive material.

17. The method for forming a pre-package according to claim 15, wherein said first layer of material has an opening and said step d) is carried out by placing said third layer into said opening so as to complete said first planar layer.

18. The method for forming a pre-package according to claim 15, wherein said one or more flexible printed circuit boards are provided in a first reel and are arranged so as to form an array, and wherein said first layer and said second layer are provided in a second reel and a third reel, respectively, and said method is carried out with a reel-to-reel process.

19. A method for forming a pre-laminate for a smartcard comprising the following steps:
a) Providing a stack of card layers so as to form a pre-laminate body having a window;
b) Forming a pre-package according to another method comprising:
Providing one or more flexible printed circuit boards, each flexible printed circuit board including at least one non-planar circuit portion and having a first side and a second side opposite to said first side;
At least partially covering said first side of each flexible printed circuit board with a first layer of material, so as to form a first planar layer on said first side;
Covering said second side of each flexible printed circuit board with a second layer of material; and
Further at least partially covering said first side with a third layer of a hardening material,
wherein said first material has a first VICAT softening temperature and said second material has a second VICAT softening temperature, and said third layer has a third VICAT softening temperature, wherein said third VICAT softening temperature is higher than said first VICAT softening temperature and/or than said second VICAT softening temperature; and
c) Embedding said pre-package in said window of said stack of card layers.

20. A method for forming a smartcard comprising the following steps:
Forming a pre-laminate according to a first other method, said pre-laminate having a first side and a second side, wherein the first other method comprises:
Providing a stack of card layers so as to form a pre-laminate body having a window;
Forming a pre-package according to a second other method comprising:
Providing one or more flexible printed circuit boards, each flexible printed circuit board including at least one non-planar circuit portion and having a first side and a second side opposite to said first side;

At least partially covering said first side of each flexible printed circuit board with a first layer of material, so as to form a first planar layer on said first side;

Covering said second side of each flexible printed circuit board with a second layer of material; and Further at least partially covering said first side with a third layer of a hardening material, wherein said first material has a first VICAT softening temperature and said second material has a second VICAT softening temperature, and said third layer has a third VICAT softening temperature, wherein said third VICAT softening temperature is higher than said first VICAT softening temperature or than said second VICAT softening temperature; and Embedding said pre-package in said window of said stack of card layers, Attaching one or more external layers to said first side or to said second side so as to cover said pre-laminate and so as to form said smartcard.

\* \* \* \* \*